Jan. 19, 1971  R. F. MARTIN ETAL  3,555,913
APPARATUS FOR CORRECTING MASS UNBALANCE IN A GYRO
Filed Jan. 16, 1969  2 Sheets-Sheet 2

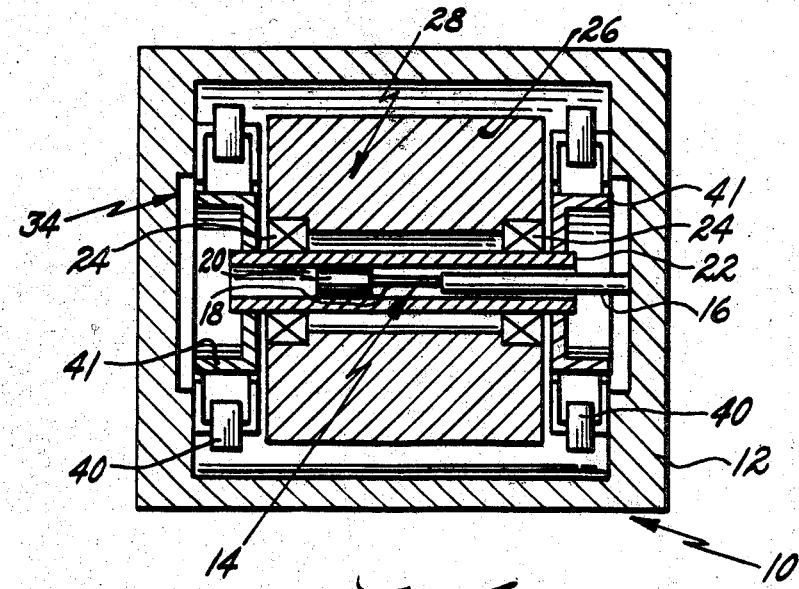
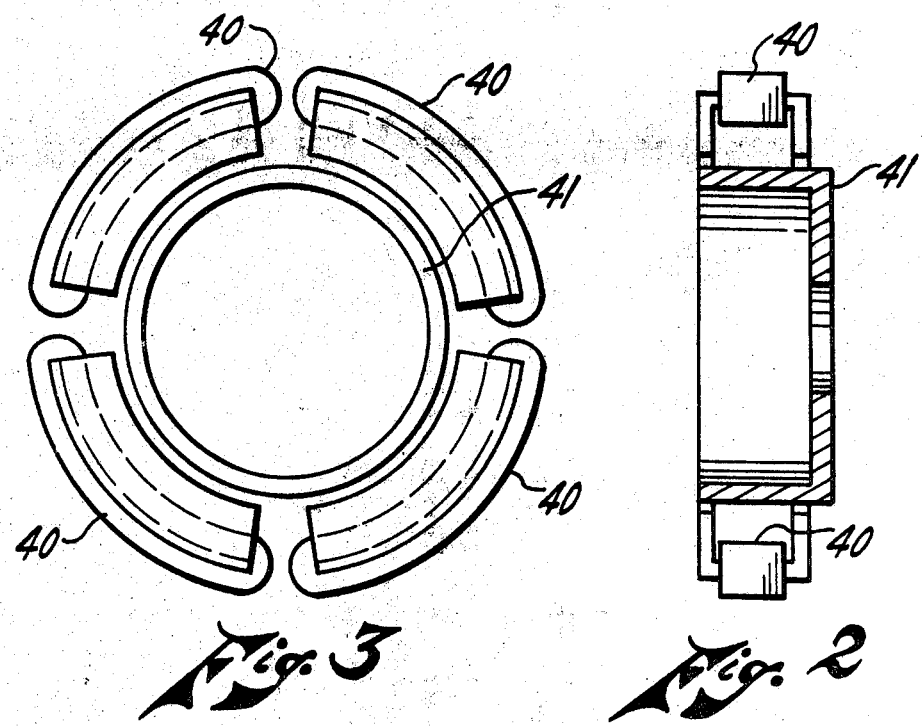

INVENTORS
ROBERT F. MARTIN
EDWARD J. HARRISON
BY Harry A. Herbert, Jr.
Jacob N. Erlich
ATTORNEYS

3,555,913
APPARATUS FOR CORRECTING MASS UNBALANCE IN A GYRO

Robert F. Martin, Elma, and Edward J. Harrison, Newfane, N.Y., assignors to the United States of America as represented by the Secretary of the Air Force
Filed Jan. 16, 1969, Ser. No. 791,745
Int. Cl. G01c 19/24
U.S. Cl. 74—5.4                5 Claims

ABSTRACT OF THE DISCLOSURE

A gyro mechanism having a magnetic mass balancer located therein. The magnetic mass balancer being capable of adjustment externally of the gyro mechanism and thereby finding utility on floated as well as unfloated gyros.

BACKGROUND OF THE INVENTION

This invention relates generally to gyro mechanisms, and more particularly to the apparatus by which mass unbalances therein may be quickly and easily compensated for. The invention is especially adapted for use in gyros such as used in guided missile guidance systems, but it is equally well adapted for use with other types of gyros.

Precision intertial navigators and attitude reference systems require highly accurate gyroscopes to provide angular information and control. One of the problems inherent in the building of extremely precise gyros is the precession due to the interaction of accelerations and a mass shift in the gyro which causes an unbalancing thereof. This mass shift in a gyro occurs when the effective mass of the entire gyro assembly moves off of the center of support of the gyro. The center of mass, often referred to as the c.g., is the point through which the total acceleration can be assumed to act. The center of support is the point through which the support forces can be assumed to act. For a gimballed gyro the gimbal bearing center is obviously the center of support. For fluid-supported or floated gyros, this center is a function of the configuration of the surface in contact with the fluid and is known as the center of buoyancy. For gyros supported by magnetic, electro-static, or superconductive forces, the center of support is a function of both geometry and the laws defining the force field. Mass shifts equal to a movement of the entire wheel of a gyro by as little as one-millionth of an inch will produce drift rates, under normal acceleration of one $g$, which will be in the order of a few hundredths of a degree per hour.

To compensate a gyro by producing a counterbalancing mass is an extremely difficult, precise, tedious and expensive operation. Heretofore such a balancing technique was accomplished on the unfloated gyro by adding or subtracting weights directly on the suspended mass in a trial and error procedure or by flowing solder by heating the instrument and tilting it in the required direction. The floated gyro requires a somewhat sophisticated scheme for balancing. The convergence of the center of gravity with the center of buoyancy and the suspension system has been heretofore facilitated by successive adjustments and balancing in air and in fluid before final assembly.

The fundamental design problems encountered in the above-mentioned balancing procedures are: (1) inadequate capacity to compensate for unexpected unbalance; (2) inadequate sensitivity so that minimum reasonable adjusting motion will correspond to desired level of balance adjustment. (3) possible motion of balance weights during vibration and operation; and (4) lack of access to balance weights after the gyro is assembled (especially in the case of the floated gyro).

SUMMARY OF THE INVENTION

The instant invention overcomes the problems heretofore encountered and as set forth above. In accordance with the instant invention we provide a plurality of compensation magnets which are permanently mounted in a fixed position on the gyro mechanism and are utilized for compensating for an unbalancing of the gyro caused by any mass shift in the gyro mechanism. The balancing system of the instant invention may be used with either the floated or unfloated gyro, and it is only essential that an elastic suspension be used which has enough lateral flexibility to achieve the mass unbalance correction.

The compensation magnet and the magnetic armature of this invention constitute a passive feed back loop in which the strength of the individual magnets is externally adjustable. The strength of these magnets is then adjusted to apply a torque to the suspended element which opposes the torque applied by the axial mass unbalance. This compensating torque can be shown to vary with the acceleration level and is applied so that it tends to cancel the mass unbalance torque for whatever $g$ level has been applied. This invention takes advantage of the fact that the magnetic force varies in an approximately inverse linear fashion for small changes in the magnetic gap.

It is therefore the main object of this invention to provide a method for correcting mass unbalance in a gyro by an apparatus which is permanently incorporated in the gyro mechanism and by which any unbalance thereof due to a measurable mass shift may be quickly and easily compensated for.

It is another object of this invention to provide an apparatus for correcting mass unbalance in a gyro in which the means for performing the adjustment is located externally from the gyro mechanism.

It is a further object of this invention to provide an apparatus for correcting mass unbalance in a gyro which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims:

DESCRIPTION OF THE DRAWING

FIG. 1 represents a semi-schematic assembly view partly in cross section of the gyro mechanism of this invention;

FIG. 2 represents an enlarged view of the support and magnets of this invention partly in cross section;

FIG. 3 is a side view of FIG. 2; and

DESCRIPTION OF THE PREFERRED EMBODIMENT

Figure 4:
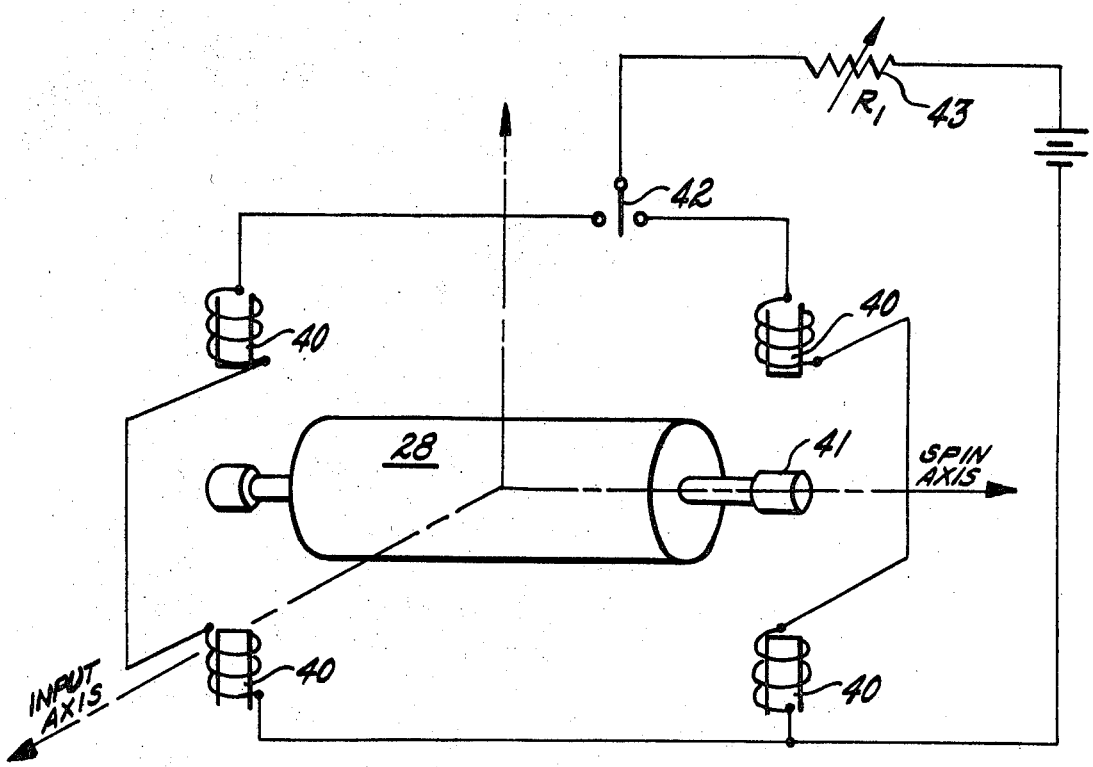
FIG. 4 is a schematic block diagram of the invention.

In accordance with the instant invention an analysis is set forth hereinbelow which demonstrates how the axial mass unbalance of a gyro may be adjusted by the use of compensating magnets.

In the case of an arrangement using magnets at each end, this axial shift of the magnetic center may be achieved by either a geometric shift of one or both of the magnets or by adjusting the differential strength between ends.

FIG. 4 illustrates a selector switch 42 to energize only one set of magnets. Other arrangements can be variable resistors at either or both ends to strengthen or weaken the magnetic field, thereby achieving a variable differential strength of the magnets.

The relationship between the end to end differential strength adjustment and the required shift of the magnetic center is given by:

$$\Delta F_o = \frac{F_o \Delta R}{R}$$

Where:

$F_o$ = nominal magnetic force
$R$ = radius from center suspension
$\Delta F_o$ = end to end differential magnetic strength adjustment
$\Delta R$ = shift in magnetic center This result also may be considered an indication of the required differential stability of the magnets.

For optimum performance of the instant invention, it is clear that:

(1) The compensating magnet arrangement should be approximately symmetrical;

(2) The compensation magnets must be considered when adjusting axial mass unbalance but this may be used to advantage in obtaining a fine adjustment of the axial mass unbalance by electrical means; and (3) The stability of the end to end differential strength of the compensation magnets must be maintained to the same degree as that of the axial mass unbalance.

Referring now to FIG. 1, the numeral 10 indicates a gyro mechanism having a housing 12 which in conventional gyros constitutes the inner gimbal. The housing 12 is rotatably secured to a platform or outer gimbal (not shown).

The housing 12 is provided with an elastic type suspension system 14 made up of a rod 16 fixedly secured at one end thereof to housing 12. The rod 16 has a flexible section 18 and an enlarged portion 20 upon which is fixedly secured by any suitable securing means a central bearing member 22. The central bearing member 22 has secured thereto a pair of spin bearings 24 on which is rotatably mounted the rotor 26.

The rotor 26, spin bearings 24, central bearing member 22 and suspension system enlarged portion 20 constitute a suspended element 28 which is allowed to move laterally and rotationally about the center of the flexible member 18 by the elasticity of the flexible member 18.

The magnetic mass balancer 34 of this invention is made up of a plurality of compensation magnets 40, and magnetic armature 41. Although a specific number of elements are shown in the drawing, any suitable number may be used. The compensation magnets 40 (shown more clearly in FIGS. 2 and 3) are shown as electromagnets but they may be permanent magnets as long as the magnet force is externally adjustable. The compensation magnets 40 are fixedly secured to the housing 12 while the magnetic armatures 41 are fixedly secured to bearing member 22 of the suspended element 28. Actuation of the magnets 40 attracts the magnetic armature 41 and thereby the suspended element 28 toward the excited magnet 40.

The entire gyro mechanism 10 may be used either in a floated or unfloated gyro assembly since the balancer 34 is located within the housing 12, and yet may be externally adjusted by control circuitry.

MODE OF OPERATION

The rotor 26 is energized by appropriate means and is brought up to the proper speed. Any mass unbalance causes the suspended element 28 to flex rotationally about the center of the flexible member 18 under lateral acceleration. This motion is detected by any suitable gyro pickoff technique. As the suspended element translates laterally under the influence of lateral acceleration, the gaps between the magnets 40 and the magnetic armature 41 on one side of the gyro increases while the gaps on the other side decrease.

If the mass unbalance of the suspended element 28 is zero, there will be no difference in the change of the magnetic gaps between the ends of the gyro. The presence of a mass unbalance, however, will result in a tendency of the suspended element 28 to tilt which tends to change the gap between magnets 40 and magnetic armatures 41 at one end more than that at the other end. If the magnets 40 are of equal strength, an additional torque in the same direction as the mass unbalance torque would be generated. The invention requires that these magnet strengths be unbalanced so that a torque opposite in direction to the mass unbalance is applied to the rotor. Referring to FIG. 4, the adjustment of the magnetic strength is accomplished by first using the switch 42 to turn on the magnets 40 at the end of the suspended element opposite to the unbalance mass. Next the variable resistor 43 can be adjusted so that the magnitude of the torque is equal to the mass unbalance and nulls it out. Once this adjustment is made, the invention will automatically compensate for the mass unbalance in any gravitational field. In order to do this, the invention makes use of the fact that the deformation of elastic suspension will be exactly proportional to the magnitude of the lateral gravitational (or acceleration) forces. In the first approximation, the magnet force and the resulting torque are proportional to the displacement of the suspended element and therefore the torque is proportional to the gravitational (or acceleration) forces. As the magnet strength has been adjusted at one level of gravitational force to null out, the bass unbalance torque, it follows that the invention will automatically null out the mass unbalance torque at any other level of gravitation (or acceleration) force.

Although the invention has been described with reference to a particular embodiment, it will be understood to those skilled in the art that the invention is capable of a variety of alternative embodiments within the spirit and scope of the appended claims.

We claim:

1. A gyro mechanism comprising a housing constituting an inner gimbal, an elastic type suspension means fixedly secured to said housing, a rotor rotatably mounted to said suspension means, a plurality of compensation magnets fixedly secured to said housing, a magnetic armature means fixedly secured to said suspension means and an actuation means operably associated with said magnets, whereby actuation of said magnets attracts said magnetic armature means attached to said suspension means toward said excited magnets thereby eliminating mass unbalance in said gyro mechanism.

2. A gyro mechanism as defined in claim 1 wherein said elastic type suspension means comprises a rod fixedly secured at one end to said housing, said rod having a flexible section and an enlarged portion, and a central bearing member fixedly secured to said enlarged portion, whereby said rotor is rotatably mounted on said bearing member.

3. A gyro mechanism as defined in claim 2 wherein said magnetic armature means comprises a pair of magnetic armatures, each fixedly secured to opposite ends of said bearing member.

4. A gyro mechanism as defined in claim 3 wherein at least one of said compensation magnets is secured to said housing substantially opposite each of said magnetic armatures.

5. A gyro mechanism as defined in claim 4 wherein said compensation magnets are electromagnets.

References Cited

UNITED STATES PATENTS

| 2,676,491 | 4/1954 | Johnson | 74—5.46 |
| 2,822,694 | 2/1958 | McKenney | 74—5.46X |
| 3,242,745 | 3/1966 | Romberg | 74—5.46 |
| 3,442,143 | 5/1969 | Schlitt | 74—5.6 |
| 3,469,458 | 9/1969 | Griffin et al. | 74—5.46 |

MANUEL A. ANTONAKAS, Primary Examiner